(12) United States Patent
Kim et al.

(10) Patent No.: US 6,470,116 B2
(45) Date of Patent: Oct. 22, 2002

(54) BIDIRECTIONAL SIGNAL TRANSMISSION DEVICE USING LIGHT

(75) Inventors: Jin-hwan Kim, Suwon (KR); Jong-kuk Mun, Suwon (KR); Woong-lin Hwang, Kunpo (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/836,538

(22) Filed: Apr. 18, 2001

(65) Prior Publication Data

US 2002/0006251 A1 Jan. 17, 2002

(30) Foreign Application Priority Data

Jun. 30, 2000 (KR) ............................................. 00-37389

(51) Int. Cl.[7] ................................................. G02B 6/34
(52) U.S. Cl. .............................. 385/37; 385/33; 385/11; 359/143
(58) Field of Search ............................... 385/11, 15, 33, 385/37, 38, 88, 92; 359/127, 130, 131, 143

(56) References Cited

U.S. PATENT DOCUMENTS

| | | | | |
|---|---|---|---|---|
| 5,359,686 A | * | 10/1994 | Galloway et al. | 385/49 |
| 5,515,195 A | * | 5/1996 | McAdams | 359/173 |
| 6,056,448 A | * | 5/2000 | Sauter et al. | 385/92 |
| 6,393,184 B1 | * | 5/2002 | Day et al. | 385/49 |

\* cited by examiner

*Primary Examiner*—Robert H. Kim
*Assistant Examiner*—Therese Barber
(74) *Attorney, Agent, or Firm*—Sughrue Mion, PLLC

(57) ABSTRACT

A bidirectional signal transmission device using light which adopts a photodiode-incorporated vertical cavity surface emitting laser (VCSEL) as light devices so that signal transmission and reception between facing light devices is achieved via the same channel, is provided. This bidirectional signal transmission device includes first and second light devices having a VCSEL part and a photodiode part incorporated with the VCSEL part, at least one optical fiber installed between the first and second light devices, and diffraction elements installed between the first light device and the input/output port of the optical fiber and between the second light device and the output port of the optical fiber, respectively, for selectively diffracting incident light so that light output from the optical fiber is received by the photodiode part, so that a received light signal having a high S/N ratio can be detected.

18 Claims, 6 Drawing Sheets

BIDIRECTIONAL SIGNAL TRANSMISSION DEVICE USING LIGHT

BACKGROUND OF THE INVENTION

1. Field of the Invention

The present invention relates to a bidirectional signal transmission device using light, which is provided to convert an electrical signal into an optical signal, transmit the optical signal, and convert the transmitted optical signal back into an electrical signal, so that bidirectional signal transmission and reception between two apparatuses are achieved, and more particularly, to a bidirectional signal transmission device using light which employs a photodiode-incorporated vertical cavity surface emitting laser (VCSEL) as a light device so that an optical signal is transmitted and received via the same channel.

2. Description of the Related Art

Electrical signals are typically transmitted in one direction along an electrical wire. However, in many cases, bidirectional transmission of electrical signals via one or two electrical wires is required. For example, an I²C serial bus or a universal serial bus (USB) line, which is used to facilitate data exchange between a desktop monitor and a video graphics card, requires bidirectional transmission of an electrical signal.

Bidirectional signal transmission using an electrical wire cannot provide transmission over a long distance due to a limit in the transmission speed, and may cause electromagnetic interference or the like. Hence, an optical signal transmission method enabling high-speed transmission without electromagnetic interference has been adopted to achieve bidirectional signal transmission.

Generally, for bidirectional optical signal transmission, an optical fiber serving as a transmission channel and an optical fiber serving as a reception channel are separately required, and reception and transmission of an optical signal are performed individually. However, the separate installation of a transmission channel and a reception channel complicates the hardware structure of a signal transmission device and increases the manufacturing costs thereof, so that this optical signal transmission method is difficult to put into use in spite of its numerous advantages.

In the prior art, a bidirectional signal transmission device designed to bidirectionally transmit an optical signal via the same channel, as shown in FIG. 1, has been proposed in consideration of the above-described point.

Referring to FIG. 1, the conventional bidirectional signal transmission device includes first and second light devices 1 and 5 for emitting light and receiving incident light, and an optical fiber 4 installed so that its input/output ports face the optical devices. The first and second light devices 1 and 5 include first and second light receiving elements 2 and 6 for receiving incident light, respectively, and first and second VCSELs 3 and 7 die-bonded to the centers of the first and second light receiving devices 2 and 6, respectively.

When an electrical signal from an apparatus (not shown) is received by the first optical device 1, the first VCSEL 3 emits an optical signal in response to the received electrical signal, and the optical signal is transmitted to the second light receiving element 6 via the optical fiber 4. Then, the second light receiving element 6 outputs an electrical signal that is proportional to the amount of received light, and the electrical signal is transmitted to another apparatus (not shown). Signal transmission in a direction opposite to the above-described signal transmission is achieved via the optical fiber 4 using the second VCSEL 7 and the first light receiving element 2 by the same method as the method described above.

The conventional bidirectional signal transmission device of FIG. 1 uses the single optical fiber 4 as a transmission channel and a reception channel.

However, in a conventional bidirectional signal transmission device, as shown in FIG. 1, light to be emitted from the input/output port of the optical fiber 4 is typically concentrated at the center of the optical fiber, so that the light receiving-regions 2a and 6a of the light receiving elements, that are at the outside of each VCSEL, receive small amounts of light. Therefore, a received signal has a low signal-to-noise (SIN) ratio.

Also, when signal transmission is performed in two directions simultaneously, the light receiving elements receive not only light transmitted from the optical fiber 4 but also light which is emitted from the VCSELs on the light receiving elements and partially reflected by the input/output port of the optical fiber 4. Thus, there is crosstalk on a detection signal, so that, the S/N ratio of a received signal is greatly degraded.

Also, a VCSEL receives part of the light that is emitted from a VCSEL on the opposite side and transmitted via the optical fiber 4, so that the relative intensity noise of the VCSEL is degraded. Thus, when transmission and reception of a signal are performed simultaneously in dual time at high speed, the bit error rate characteristic deteriorates.

Furthermore, the conventional bidirectional signal transmission device has a structure in which the VCSELs 3 and 7 are die-bonded to the light receiving elements 2 and 6, respectively, so that a yield reduction due to assembly error and bonding error may be caused during die bonding.

SUMMARY OF THE INVENTION

To solve the above problems, an objective of the present invention is to provide a bidirectional signal transmission device using light, which adopts as a light device a VCSEL incorporated into a photodiode in a semiconductor manufacturing process, and is designed to increase the light receiving efficiency by installing a diffraction element for diffracting light emitted from an optical fiber and directing the diffracted light to the light receiving region of a light receiving element, between the light device and the input/output port of the optical fiber.

The above objective of the present invention is achieved by a bidirectional signal transmission device using light including: an optical unit including at least one of first and second light devices having a vertical cavity surface emitting laser (VCSEL) unit for emitting light in the direction semiconductor material layers are stacked and a photodiode part incorporated with the VCSEL part for receiving incident light, at least one optical fiber installed between facing first and second light devices for transmitting an optical signal, and diffraction elements installed between the first light device and one input/output port of the optical fiber, and between the second light device and the other input/output port of the optical fiber, respectively; for selectively diffracting incident light so that light output from the optical fiber is received by the photodiode part; a first circuit unit for controlling the first light device, so that an electrical signal from a first apparatus is converted into an optical signal, and so that an optical signal transmitted via the optical fiber is converted into an electrical signal and then transmitted to the first apparatus; and a second circuit unit for controlling the second light device so that an electrical signal from a second apparatus is converted into an optical signal, and so that an optical signal transmitted via the optical fiber is converted into an electrical signal and then transmitted to the second apparatus, wherein signal transmission and reception between the facing first and second light devices are performed via the same channel.

According to an aspect of the present invention, the diffraction element is a diffraction grating or a hologram optical element for diffracting incident light in a +1st and/or −1st order.

According to another aspect of the present invention, the corresponding first and second light devices emit perpendicular polarized light beams, and the diffraction element is a polarization diffraction element designed so that polarized light incident from the VCSEL part is transmitted straight through the diffraction element and received by the optical fiber, and so that polarized light incident from the optical fiber is diffracted in a +1st and/or −1st order and headed for the photodiode part.

Here, the optic axis of the polarization diffraction element is approximately perpendicular to the direction of linear polarization of light emitted from a VCSEL part that faces the polarization diffraction element.

Each of the first and second circuit units includes: a driver for driving a VCSEL part; and an amplifier for amplifying a current signal output from the photodiode part.

Preferably, each of the first and second circuit units further includes a controller installed between an apparatus and the amplifier and the driver, for converting an electrical signal from the apparatus into a signal that is suitable for controlling the driver, and converting a signal from the amplifier into a signal suitable for the apparatus.

It is also preferable that the first and/or second circuit unit further includes a switch installed between the controller and the driver and amplifier, for selectively switching on and off the driver and/or the amplifier.

BRIEF DESCRIPTION OF THE DRAWINGS

The above objective and advantage of the present invention will become more apparent by describing in detail preferred embodiments thereof with reference to the attached drawings in which.

DESCRIPTION OF THE PREFERRED EMBODIMENTS

Figure 1:
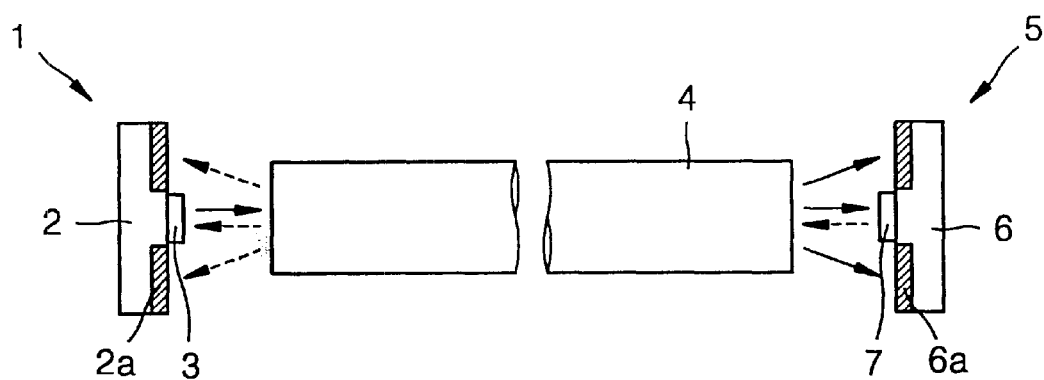
FIG. 1 is a schematic view of an example of a conventional bidirectional signal transmission device.
Figure 2:
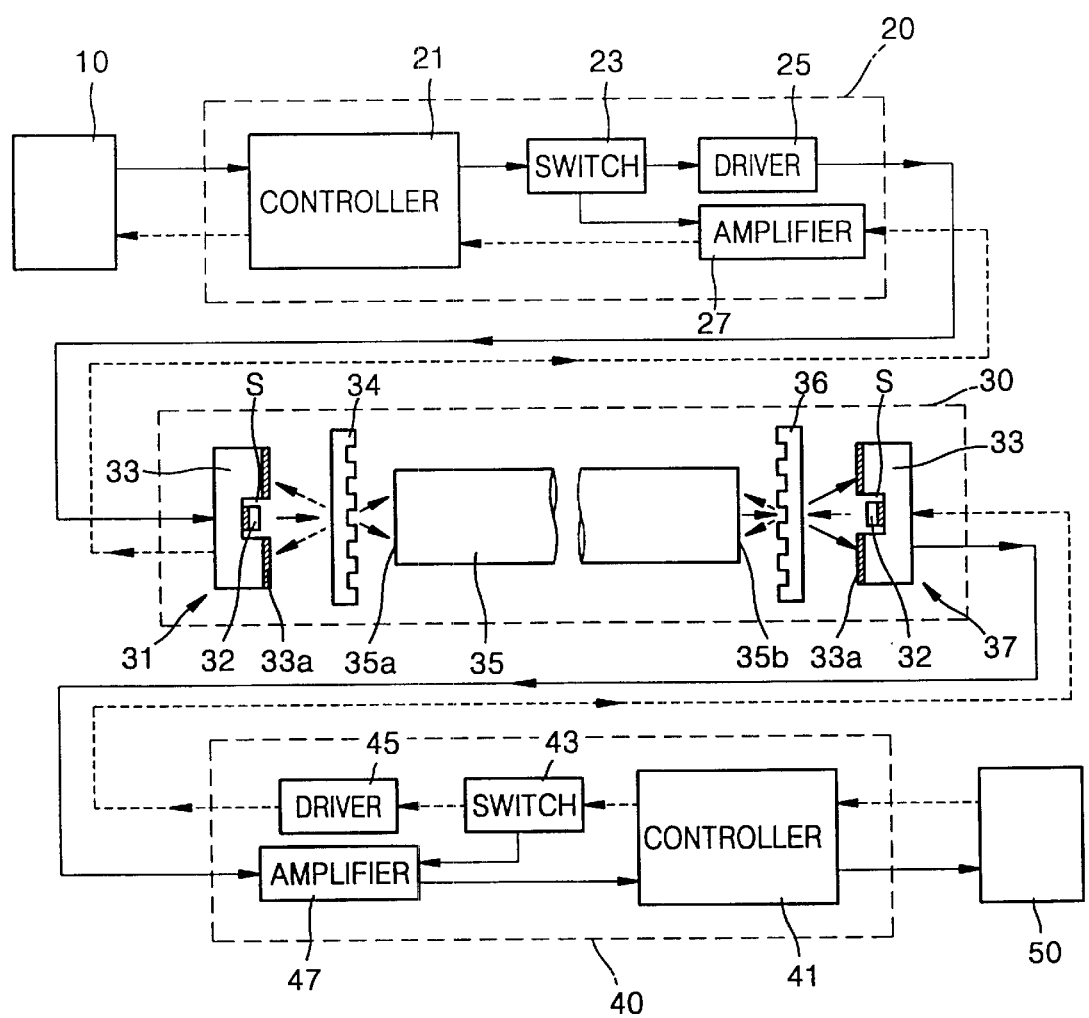
FIG. 2 is a schematic view illustrating the entire structure of a bidirectional signal transmission device using light adopting an optical unit according to an embodiment of the present invention.

FIG. 2 is a schematic view of a bidirectional signal transmission device using light which adopts an optical unit according to an embodiment of the present invention. Referring to FIG. 2, the bidirectional signal transmission device using light according to the present invention includes an optical unit 30 and first and second circuit units 20 and 40. The optical unit 30 includes first and second light devices 31 and 37 for converting an electrical signal into an optical signal, transmitting the optical signal, and converting the transmitted optical signal back into an electrical signal, so that the optical unit can transmit a signal in two directions. The first circuit unit 20 drives the first light device 31 in response to an electrical signal output from a first apparatus 10, and converts an electrical signal output from the first light device 31 into a signal that is suitable for the first apparatus 10. The second circuit unit 40 drives the second light device 37 in response to an electrical signal output from a second apparatus 50, and converts an electrical signal output from the second light device 37 into a signal that is suitable for the second apparatus 50.

The optical unit 30 includes the first and second light devices 31 and 37, an optical fiber 35, and first and second diffraction elements 34 and 36. The first and second light devices 31 and 37 convert an electrical signal into an optical signal and Ad converts the optical signal back into an electrical signal. The optical fiber 35 is installed between the first and second light devices 31 and 37, and transmits incident light. The first and second diffraction elements 34 and 36 are installed between the input/output port 35a of the optical fiber 35 and the first light device 31, and between the input/output port 35b of the optical fiber 35 and the second light device 37, respectively.

Preferably, photodiode-incorporated VCSELs are adopted as the first and second light devices 31 and 37, so that a signal can be transmitted and received via a single channel. The photodiode-incorporated VCSEL is made up of a VCSEL part 32 for emitting light in the direction in which the semiconductor material layers are stacked, and a photodiode part 33 incorporated with the VCSEL part 32 for receiving light that is incident upon the peripheral portions of the VCSEL part 32.

The photodiode-incorporated VCSEL is fabricated in a single body by a semiconductor manufacturing process. For example, the photodiode-incorporated VCSEL is manufactured by forming the basic semiconductor stacked structure of a VCSEL on a semiconductor substrate, etching the outskirts of the VCSEL part 32 to electrically isolate the VCSEL part 32 from the photodiode part 33, forming the semiconductor structure of the photodiode part 33 by etching and/or stacking some layers of the photodiode part 33, and forming electrode patterns on the VCSEL part 32 and the photodiode part 33. FIG. 2 shows an example in which the photodiode part 33 protrudes more than the VCSEL part 32, and a space S for electrical insulation is formed between the VCSEL part 32 and the photodiode part 33. Here, the space S can be coated with an insulating material. The semiconductor stacked structure of the VCSEL part 32 and the photodiode part 33 is well known, so it will not be shown or described in detail.

When the described photodiode-incorporated VCSEL is used as the first and second light devices 31 and 37, a special assembly process such as die bonding is not needed. Therefore, the use of the described photodiode-incorporated VCSEL prevents yield reduction due to assembly errors and bonding errors during die bonding, which is a problem that occurs in a conventional bidirectional signal transmission device.

The optical fiber 35 transmits light received from the first and second light devices 31 and 37. It is preferable that the optical fiber 35 is a plastic optical fiber which costs less than a glass optical fiber and is easier for optical coupling than the glass optical fiber because of the large diameter of the plastic optical fiber. The use of the plastic optical fiber as the optical fiber 35 can reduce damage to the optical fiber 35 due to external impacts.

The first and second diffraction elements 34 and 36 are installed between the input/output port 35a of the optical fiber 35 and the first light device 31, and between the input/output port 35b of the optical fiber 35 and the second light device 37, respectively. Here, the first and second diffraction elements 34 and 36 are diffraction gratings or hologram optical elements for diffracting incident light in a +1st and/or −1st order. The first and second diffraction elements 34 and 36 couple as much light output from the optical fiber 35 as possible to the receiving region 33a of the photodiode part 33 at the outside of the VCSEL part 32, thereby increasing the reception efficiency of light transmitted via the optical fiber 35. Thus, a received optical signal having a high S/N ratio can be detected.

The intensity of light output from the optical fiber 35 is concentrated along the optical axis of the optical fiber 35, so that the light approximately has a Gaussian intensity distribution. Accordingly, when light output from the optical fiber 35 is diffracted in a +1st and/or −1st order as described above, most of the light is received by the light receiving region 33a of the photodiode part 33 on the outside of the VCSEL part 32. Hence, the bidirectional signal transmission device using light according to the present invention does not have the problems of a conventional bidirectional signal transmission device, such as a degradation of the light reception efficiency due to most light heading for a VCSEL located at the center of a light device, or a degradation in the relative intensity noise of the VCSEL.

The first and second diffraction elements 34 and 36 diffract not only light output from the input/output ports 35a and 35b of the optical fiber 35 but also light which is emitted from the VCSEL part 32 and heads for the input/output ports 35a and 36b of the optical fiber 35, in a +1st and/or −1st order. Hence, it is preferable that the first and second diffraction elements 34 and 36 are closer to the input/output ports 35a and 35b of the optical fiber 35 than to the first and second light devices 31 and 37, respectively. In this case, light emitted from the VCSEL part 32 is diffracted in a +1st and/or −1st order by the first and second diffraction elements 34 and 36. However, since the first and second diffraction elements 34 and 36 are close to the input/output ports 35a and 35b of the optical fiber 35, a sufficient amount of light can be input to the optical fiber 35. Also, since the first and second diffraction elements 34 and 36 are separated from the first and second light devices 31 and 37 at relatively sufficient intervals, most of the light diffracted in a +1st and/or −1st order can be received by the light receiving region 33a of the photodiode: part 33.

Here, the diffraction of incident light only in a +1st and/or −1st order, not in zero-th order, by the first and second diffraction elements 34 and 36 is achieved by removing zero-th light by controlling the pattern depth of a diffraction pattern, for example, the grating depth of a diffraction grating, to have a phase difference of one half wavelength.

Figure 3:
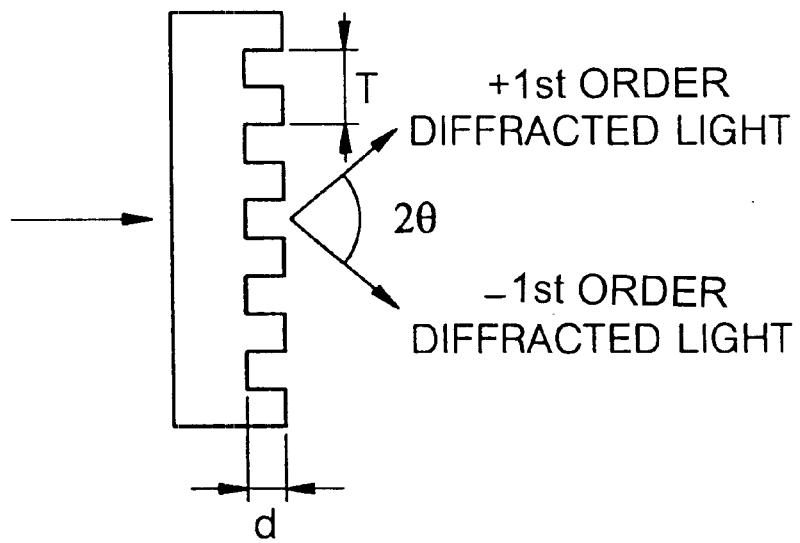
FIGS. 3 and 4 are schematic views of the shapes of the cross-section of the diffraction pattern of a diffraction element according to other embodiments of the present invention.

For example, the duty ratio as shown in FIG. 3 is 0.5, the diffraction angle (θ) of a diffraction grating, the diffraction pattern (the grating pattern) of which has an angular cross-section, is expressed in Equation 1:

$$\theta = \text{Arc } \sin(k\lambda/T) \quad (1)$$

wherein λ denotes the wavelength of incident light, T denotes the grating period, and denotes the diffraction order such as 0, ±1, ±2, ±3, . . . . A zero-th order diffracted light efficiency ($\eta_0$) and ±1st order diffracted light efficiency ($\eta_{\pm 1}$) are expressed in Equation 2:

$$\eta_0 = \cos^2 \phi$$

$$\eta_{\pm 1} = 4 \sin^2 \phi/\pi^2 \quad (2)$$

wherein φ is $\pi/(\lambda(n-1)d)$ (where d indicates the grating depth, and n indicates the refractivity).

Accordingly, when the first and second diffraction elements 34 and 36 according to the present invention are angular diffraction gratings having a duty ratio of 0.5, as shown in FIG. 3, and a grating depth (d) and a refractivity (n) that allow the zero-th order diffraction efficiency to be zero with respect to the wavelength (λ) of light emitted from the first and second light devices 31 and 37, the maximum optical efficiency, the sum of light diffracted in +1st and −1st orders by the first and second diffraction elements 34 and 36, is about 82%, and light is rarely diffracted in the zero-th order.

Figure 4:
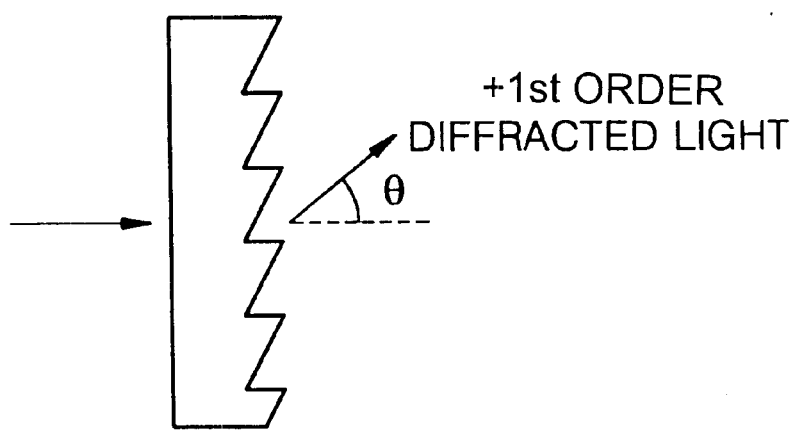

Also, the first and second diffraction elements 34 and 36 according to the present invention can be blazed diffraction gratings, the diffraction pattern of which has a blazed cross-section, as shown in FIG. 4, in order to increase the diffraction efficiency. If the blazed diffraction grating diffracts incident light in a +1st order, and is blazed in 8 steps, the efficiency of +1st order diffracted light is about 95%.

When the blazed diffraction gratings are adopted as the first and second diffraction elements 34 and 36, they provide a high efficiency of diffracting incident light in the 1st order, compared to angular diffraction gratings, so that a high S/N ratio can be obtained. This merit is also guaranteed when angular or blazed hologram elements, the diffracting pattern of which has an angular or blazed cross-section, are adopted as the first and second diffracting elements 34 and 36. FIG. 2 shows an example in which diffraction gratings or hologram elements, the diffracting pattern of which has an angular cross-section, are adopted as the first and second diffraction elements 34 and 36.

Figure 5:
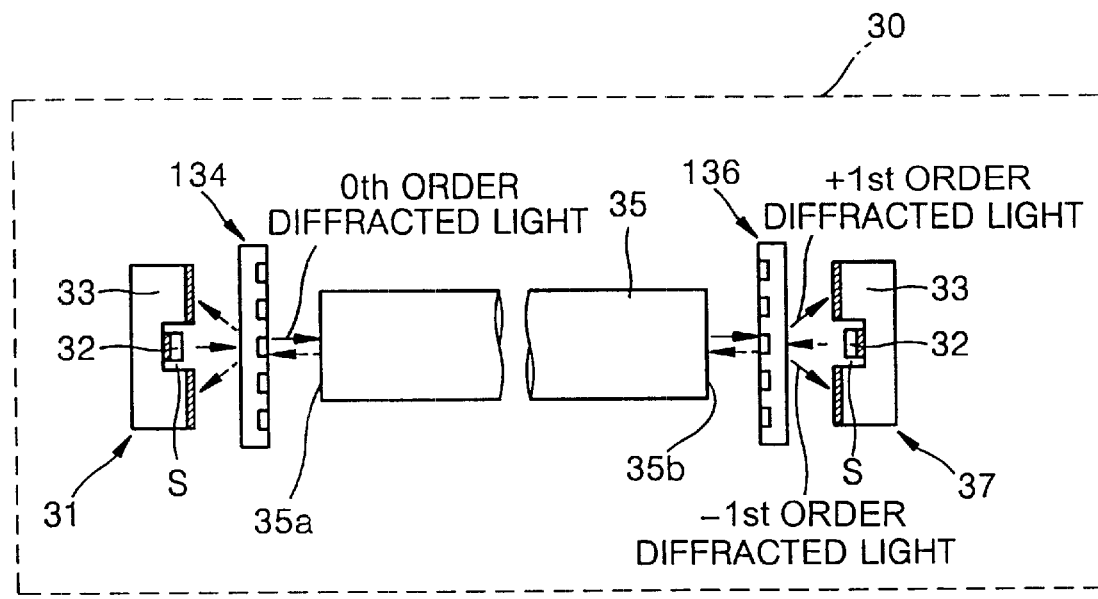
FIG. 5 schematically shows another embodiment of an optical unit according to the present invention.

The optical unit 30 according to the present invention can include first and second polarization diffraction elements 134 and 136 instead of the first and second diffraction elements 34 and 36, as shown in FIG. 5. Here, the first and second light devices 31 and 37 are disposed to linearly emit polarized light beams in approximately perpendicular directions. A VCSEL usually emits approximately linearly-polarized light. Accordingly, when the first and second light devices 31 and 37 are arranged so that the directions of linear polarization of light emitted from the VCSEL part 32 cross each other at right angles, they can emit polarized light in perpendicular directions.

Figure 6:
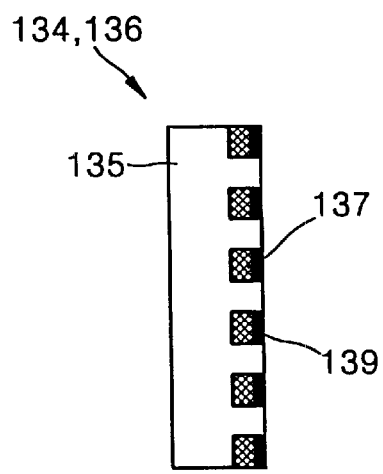
FIG. 6 is a view illustrating the polarized light diffracting element of FIG. 5.

The first and second polarization diffraction elements 134 and 136 can be refractivity change diffracting elements, as shown in FIG. 6. A refractivity change diffracting element is obtained by forming a proton exchange layer 137 on a birefringence plate 135 made of a birefringence material such as $LiNBO_3$, in a diffraction grating or hologram diffraction pattern, and forming a dielectric film 139 on the proton exchange layer 137.

For example, the refractivity change diffracting element does not change the refractive index of ordinary light and changes the refractive index of extraordinary light to generate +1st and −1st order diffracted light.

That is, ordinary light travels straight due to a refractive index corresponding to the difference in the refractive index between the proton exchange layer 137 and the dielectric film 139. This is because little refractive index difference is experienced by ordinary light between the birefringence plate 135 and the proton exchange layer 137 and the dielectric film 139. Conversely, extraordinary light undergoes a refractive index corresponding to the sum of the refractive index of the proton exchange layer 137 and that of the dielectric film 139, so that it is diffracted in +1st and −1st orders. This is because a big refractive index difference is experienced by extraordinary light between the birefringence plate 135 and the proton exchange layer 137 and the dielectric film 139.

Here, ordinary light corresponds to the case where the direction of linear polarization of incident light is perpendicular to the optic axis of the birefringence plate 135, and extraordinary light corresponds to the case where the direction of linear polarization of incident light is parallel to the optic axis of the birefringence plate 135.

Accordingly, the first and second polarization diffraction elements 134 and 136 are disposed so that the optic axis of the birefringence plate 135 of the first polarization diffraction element 134 is perpendicular to that of the birefringence plate 135 of the second polarized light diffraction element 136, so that the direction of the optic axis of the birefringence plate 135 of the first polarization diffraction element 134 is perpendicular to the direction of linear polarization of light emitted from the second light device 37, and so that the direction of the optic axis of the birefringence plate 135 of the second polarization diffraction element 136 is perpendicular to the direction of linear polarization of light emitted from the first light device 31.

Thus, the first polarization diffraction element 134 diffracts light, which has been linearly polarized in a first direction and emitted from the VCSEL part 32 of the first light device 31, in the zero-th order, and directs the diffracted light toward the input/output port 35a of the optical fiber 35. Also, the first polarization diffraction element 134 diffracts light, which has been linearly polarized in a second direction that is perpendicular to the first direction, emitted from the second light device 37, transmitted through the optical fiber 35, and incident from the input/output port 35a, in the +1st and/or −1st order, and directs the diffracted light toward the photodiode part 33 of the first light device 31.

Similarly, the second polarization diffraction element 136 diffracts light, which has been linearly polarized in the second direction and emitted from the VCSEL part 32 of the second light device 37, in the zero-th order, and directs the diffracted light toward the input/output port 35b of the optical fiber 35. Also, the second polarization diffraction element 136 diffracts light, which has been linearly polarized in the first direction, emitted from the first light device 31, transmitted through the optical fiber 35, and incident from the input/output port 35b, in the +1st and/or −1st order, and directs the diffracted light toward the photodiode part 33 of the second light device 37.

Accordingly, light output from each of the input/output ports 35a and 35b of the optical fiber 35 is mostly diffracted in the +1st and/or −1st order by the first and second polarization diffraction elements 134, 136, respectively, and received by the photodiode part 33 of the first and second light devices 31, 37, respectively.

Hence, if the optical unit 30 having the above-described first and second polarization diffraction elements 134 and 136 is adopted, when digital communications takes place in dual time at high speed, light output from a VCSEL part can be prevented from being coupled to the opposite VCSEL part. The use of the optical unit 30 having such a structure prevents a deterioration in the relative intensity noise of a VCSEL part caused by the coupling of light from the opposite VCSEL part to the VCSEL part in a conventional structure, and also prevents a consequential degradation of the bit error rate of a signal. Furthermore, light emitted from the VCSEL part of a light device is prevented from being partly reflected by the input/output port of the optical fiber 35, back toward the photodiode part of the light device. Therefore, crosstalk of a detection signal caused by partial deflection of light by the input/output port of an optical fiber is not generated.

Figure 7:
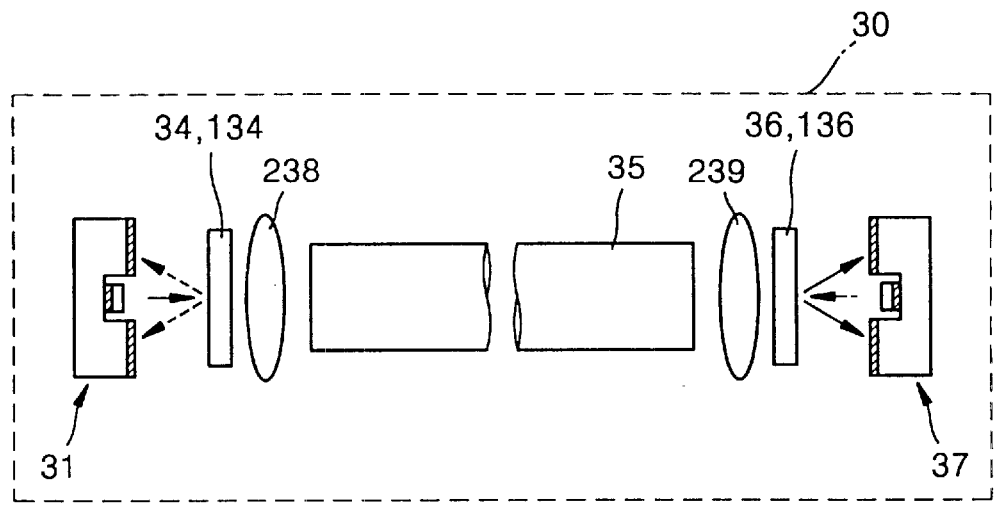
FIGS. 7 and 8 are schematic views of other embodiments of the optical unit of FIGS. 2 and 5.
Figure 8:
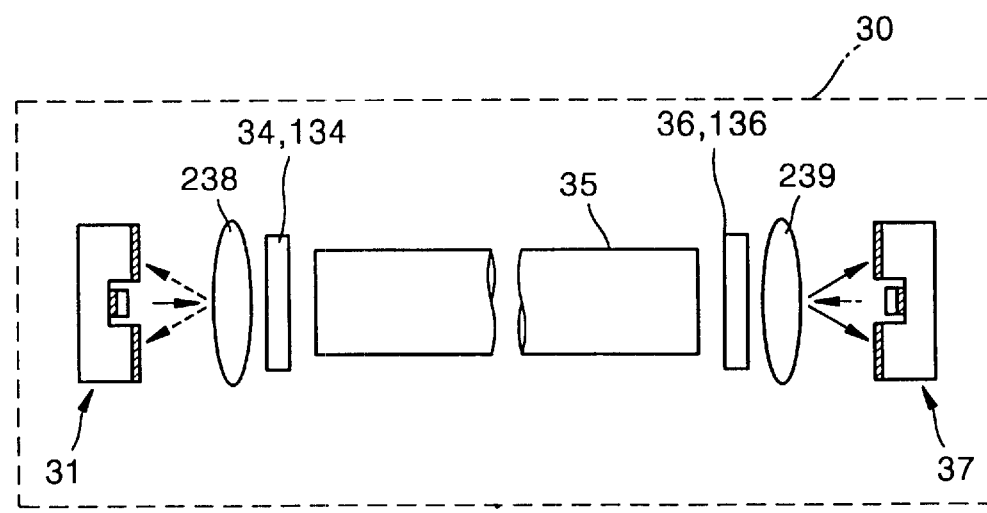

The optical unit 30 according to the present invention shown in FIGS. 2 and 5 can further include lenses 238 and 239 for focusing incident light, between the first so diffraction element 34 or 134 and the input/output port 35a of the optical fiber 35 and between the second diffraction element 36 or 136 and the input/output port 35b of the optical fiber 35, respectively, as shown in FIG. 7, in order to increase the efficiency of coupling light emitted from the VCSEL part 32 to the optical fiber 35. Further, the lenses 238 and 239 can be installed between the first light device 31 and the first diffraction element 34 and between the second light device 37 and the second diffraction element 36, respectively, as shown in FIG. 8.

Referring back to FIG. 2, the first and second circuit units 20 and 40 include first and second drivers 25 and 45 for driving the VCSEL part 32 of the first and second light devices 31 and 37, and first and second amplifiers 27 and 47 for amplifying a current signal output from the photodiode part 33 of the first and second light devices 31 and 37, respectively.

Preferably, the first and second circuit units 20 and 40 further include a first controller 21 installed between the first amplifier 27 and the first driver 25, and the first apparatus 10, and a second controller 41 installed between the second amplifier 47 and the second driver 45, and the second apparatus 50, respectively. Also, preferably, the first and second circuit units 20 and 40 further include a first switch 23 installed between the first driver 25 and the first amplifier 27, and the first controller 21, and a second switch 43 installed between the second driver 45 and the second amplifier 47, and the second controller 41, respectively.

The first and second controllers 21 and 41 convert electrical signals received from the first and second apparatuses 10 and 50 into signals having formats that are suitable for controlling the first and second drivers 25 and 45, respectively, and also convert signals output from the first and second amplifiers 27 and 47 into signals having formats that are suitable for the first and second apparatuses 10 and 50, respectively.

Figure 9:
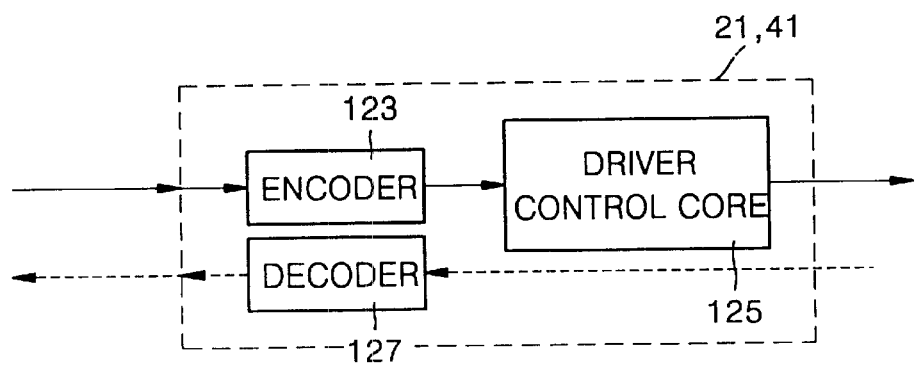
FIGS. 9 and 10 are block diagrams of embodiments of a controller according to the present invention.
Figure 10:
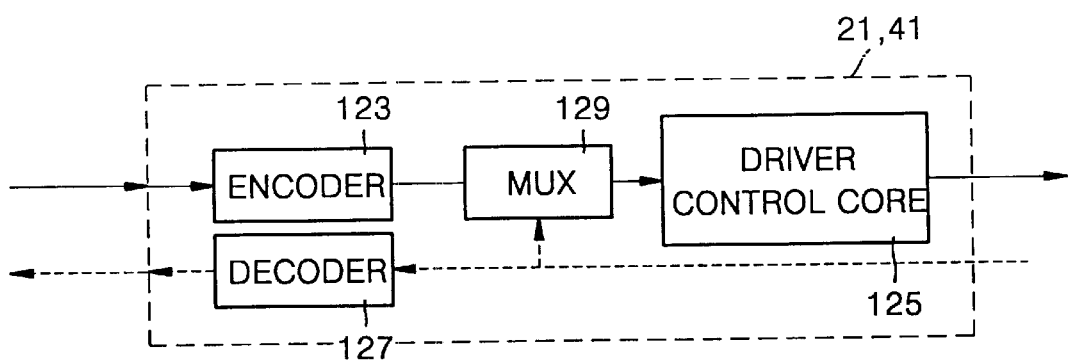

Each of the first and second controllers 21 and 41 includes an encoder 123, a driver control core 125 and a decoder 127, as shown in FIG. 9. The encoder 123 encodes an electrical signal from each of the first and second apparatuses 10 and 50 into a signal having a suitable format. The driver control core 125 converts a signal encoded by the encoder 123 into a signal having a format that is suitable for controlling each of the first and second drivers 25 and 45, and applies the converted signal to each of the first and second drivers 25 and 45. The decoder 127 decodes a signal received from each of the first and second amplifiers 27 and 47 into a signal having a format that is suitable for each of the first and second apparatuses 10 and 50. Preferably, each of the first and second controllers 21 and 41 further includes a multiplexer (MUX) 129 between the encoder 123 and the driver control core 125, as shown in FIG. 10. The MUX 129 feeds a signal detected by the photodiode part 37 back to the driver control core 125 or the driver 25 (45), and controls the VCSEL part 32 according to the detected signal.

Referring back to FIG. 2, the first and second switches 23 and 43 operate mutually correspondingly under the control of the first and second controllers 21 and 41, and selectively switch on and off the drivers 25 and 45 and the amplifiers 27 and 47, respectively.

The signal transmission device using light according to the present invention having the first and second switches 23 and 43 is adopted between the first and second apparatuses 10 and 50, so that the first and second apparatuses 10 and 50 can exchange appropriate signals with each other.

That is, when a system, which is designed so that the first and second apparatuses 10 and 50 can alternately exchange signals as needed while simultaneously transmitting and receiving signals in two directions, adopts as the signal transmission device using light according to the present invention, even when the S/N ratio of a received signal is severely degraded, or even upon a mode where one apparatus sends a signal and then the other apparatus sends a responding signal, the first and second switches 23 and 43 operate mutually correspondingly under the control of the first and second controllers 21 and 41, respectively. Thus, the first and second apparatuses 10 and 50 can exchange signals in turns.

Also, when a system, which is designed so that the first and second apparatuses 10 and 50 transmit and receive signals bidirectionally, adopts the signal transmission device using light according to the present invention, the first and second switches 23 and 43 operate mutually correspondingly under the control of the controllers 21 and 41, respectively, even when the S/N ratio of a signal is degraded. Consequently, the S/N ratio of a signal increases, resulting in a reduction in the data transmission error rate.

For example, when a signal, which is transmitted from one of the first and second light devices 31 and 37 via the optical fiber 35 and received by the photodiode part 33, is severely degraded by light from the VCSEL part 32 of the other light device being reflected by a light device such as the diffraction elements 34, 36, 134 and 136 and/or the lenses 138 and 139, or by the input/output port 35a/35b of the optical fiber 35, and received by the photodiode part 33 of the other light device, the first and second switches 23 and 43 are operated to alternately switch on and off the first and second drivers 25 and 45 and the second and first amplifiers 47 and 27 under the control of the first and second controllers 21 and 41, respectively. Thus, a signal is transmitted in turns between the first and second apparatuses 10 and 50. When the signal transmission is performed in turns, as described above, the speed of signal transmission between the first and second apparatuses 10 and 50 decreases, but a signal can be received at a high S/N ratio. This leads to a reduction in the error rate of data transmission.

When a system, which is designed so that the first and second apparatuses 10 and 50 transmit signals in one direction, adopts the signal transmission device using light according to the present invention, one switch transmits a driving signal to a driver and simultaneously keeps an amplifier in an off state, and the other switch switches off a driver and simultaneously keeps an amplifier in an on state. This enables transmission of a signal in one direction.

When a system, which is designed so that the first and second apparatuses 10 and 50 exchange a signal with each other in turns, adopts the signal transmission device using light according to the present invention, the first and second switches 23 and 43 alternately switch on and off the first and second drivers 25 and 45 and the second and first amplifiers 47 and 27. Thus, signal exchange between apparatuses is performed in turns.

When a system, which is designed so that the first and second apparatuses 10 and 50 necessarily exchange signals with each other in two directions at the same time, adopts the signal transmission device using light according to the present invention, the first and second switches 23 and 43 switch on the first and second drivers 25 and 45 and the first and second amplifiers 27 and 47, respectively, and are maintained in on states. Hence, signals can be transmitted and received in two directions at the same time.

Figure 11:
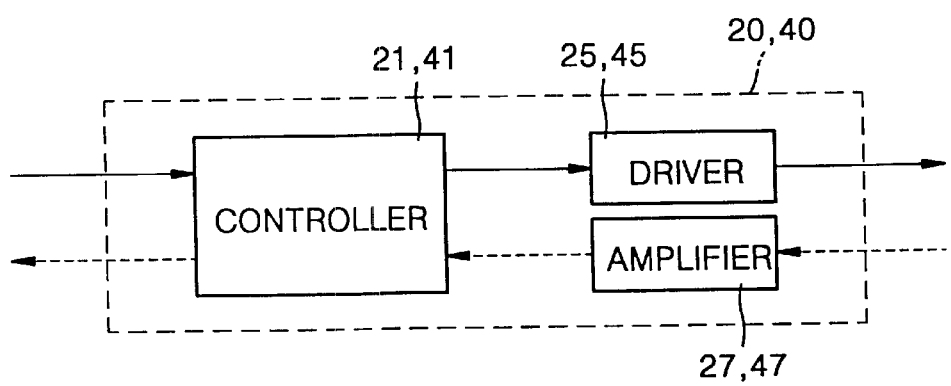
FIG. 11 is a block diagram of another embodiment of first and second circuit units according to the present invention.

Of course, in the case of a system designed so that the first and second apparatuses 10 and 50 necessarily exchange signals with each other at the same time, the signal transmission device using light according to the present invention can adopt first and second circuit units 20 and 40 each having no switches, as shown in FIG. 11.

In the signal transmission device using light according to the present invention having such a structure, it is preferable that an optical unit 30 is single-modularized (i.e., contained within a single module). When the optical unit 30 is single-modularized, the first and second apparatuses 10 and 50 may be electrically separated from or connected to the optical unit 30.

A conventional signal transmission device has a structure in which apparatuses are connected to each other by attachment of a connector on which a light device is installed to a connector on which an optical fiber is installed, so that the optical alignment error between the light device and the optical fiber is generated by repetition of attachment and detachment between the two connectors. This causes data error and a change in the amplitude of an optical signal. In contrast to the conventional signal transmission device as described above, the signal transmission device according to the prevent invention does not have these problems, thus guaranteeing reliability.

When the signal transmission device according to the present invention having the single-modularized optical unit 30 described above is applied to typical apparatuses designed so that signal transmission is performed by electrical connection, even when the first and second circuit units 20 and 40 are diversely combined between the optical unit 30 and the first apparatus 10 and between the optical unit 30 and the second apparatus 50, as described later, there is no need to change the port structure of an apparatus. Hence, a signal transmission device according to the present invention adopting the single-modularized optical unit 30 is compatible for general-purpose apparatuses.

The first and second circuit units 20 and 40 can be single-modularized with the optical unit 30. That is, the first circuit unit 20, and the first light device 31, the diffraction element and one end of the optical fiber 35 in the optical unit 30 can be installed at a first connector (not shown) for enabling electrical connection to the first apparatus 10, and the second circuit unit 40, and the second light device 37, the diffraction element and the other end of the optical fiber 35 in the optical unit 30 can be installed at a second connector (not shown) for enabling electrical connection to the second apparatus 50. In this case, when the first and second connectors are fit into the first and second apparatuses 10 and 50, respectively, the signal transmission device using light according to the present invention is electrically coupled to the first and second apparatuses 10 and 50, and converts electrical signals from the first and second apparatuses 10 and 50 into optical signals, transmit the optical signals via the optical fiber 35, convert the; optical signals back into electrical signals, and transmit the electrical signals to the second and first apparatuses 50 and 10, respectively.

In each of the first and second circuit units 20 and 40, at least one among some component elements, for example, a driver and an amplifier, is modularized with the optical unit 30, and the rest can be installed in the first and second apparatuses 10 and 50.

The whole component elements of the first and second circuit units 20 and 40 can be installed in the first and second apparatuses 10 and 50, respectively. In this case, the first and second apparatuses 10 and 50 are electrically connected to the optical unit 30, such that a driving signal output from the driver of a circuit unit installed in the first and/or second apparatuses 10 and/or 50 is transmitted to the optical unit 30, and an electrical signal output from the optical unit 30 is applied to the amplifier of the circuit unit installed in the first and/or second apparatuses 10 and/or 50.

Here, only some components of the optical unit 30 are modularized, and the rest can be installed in the first and/or second apparatuses 10 and/or 50. For example, the first and second light devices 31 and 37 are installed in the first and second apparatuses 10 and 50, respectively, together with the first and second circuit units 20 and 40, while only the diffraction elements 34 and 36 (or 134 and 136) and the optical fiber 35 can be modularized. In this case, the optical unit 30 modularized separately from the first and second apparatuses 10 and 50 has a port structure for optical connection. Alternatively, the first light device 31 and the first diffraction element 34 or 134 are installed in only the first apparatus 10, while the remaining components can be modularized. In this case, the modularized optical unit 30 and the first apparatus 10 have port structures for optical connection, and is electrically connected to the second apparatus 50.

Here, the first circuit unit 20, the first light device 31 and a diffraction element are installed in the first apparatus 10, while the second circuit unit 40, the second light device 37 and a diffraction element are installed in the second apparatus 50. In this case, the first and second apparatuses 10 and 50 have port structures by which they can be optically connected to the input/output port 35a/35b of the optical fiber 35.

In the above, the case in which a signal transmission device using light according to the present invention includes a pair of first and second light devices and a single optical fiber installed to face them so that signal transmission and reception via a single channel can be achieved, has been described as an example. The signal transmission device using light according to the present invention can be simply converted to a multi-channel signal transmission device by setting the first and second light devices in array and installing an optical fiber between facing first and second light devices. Thus, a multi-channel signal transmission device using light according to the present invention will not be shown and described in detail since it can be sufficiently inferred from the structure of a single-channel signal transmission device.

The signal transmission device using light according to the present invention as described above includes a diffraction element between the input/output port of a an optical fiber and a light device, so that light emitted from the optical fiber is diffracted in a +1st and/or −1st order and heads for the photodiode part of the light device. Thus, a received optical signal having a high S/N ratio can be detected.

Also, since light emitted from the optical fiber is diffracted in a +1st and/or −1st order and headed for the photodiode part of the light device, there is no degradation in the relative intensity noise of a VCSEL caused by a conventional structure in which part of light, which is emitted from the opposite VCSEL and transmitted via an optical fiber, is incident upon the VCSEL. Accordingly, even when signal transmission and reception are performed simultaneously in dual time, an excellent signal bit error rate can be obtained.

Also, since a VCSEL incorporated into a photodiode in a semiconductor manufacturing process is adopted as the light device, a die-bonding process can be omitted. Thus, assembly errors caused upon die bonding, and a yield reduction due to bonding error in the conventional structure are not generated.

Furthermore, when a polarization diffraction element is adopted as the diffraction element, light emitted from the VCSEL part of the light device can be., prevented from being partly reflected by the input/output port of the optical fiber and heading for the photodiode part. Thus, crosstalk of a detection signal caused by light partly reflected by the input/output port of an optical fiber is not generated.

What is claimed is:

1. A bidirectional signal transmission device using light comprising:

an optical unit including (1) a first light device facing a second light device, each of the first and the second light devices having a vertical cavity surface emitting laser (VCSEL) unit for emitting light in a direction in which semiconductor material layers are stacked and a photodiode part incorporated with the VCSEL part for receiving incident light, (2) at least one optical fiber installed between the first and the second light devices for transmitting an optical signal, and (3) a first diffraction element installed between the first light device and a first input/output port of the optical fiber, and a second diffraction element installed between the second light device and a second input/output port of the optical fiber, the first and the second diffraction elements for selectively diffracting incident light so that light output from the optical fiber is received by the corresponding photodiode part;

a first circuit unit for controlling the first light device so that an electrical signal from a first apparatus is converted into an optical signal, and so that an optical signal transmitted via the optical fiber is converted into an electrical signal and then, transmitted to the first apparatus; and a second circuit unit for controlling the second light device so that an electrical signal from a second apparatus is converted into an optical signal, and so that an optical signal transmitted via the optical fiber is converted into an electrical signal and then transmitted to the second apparatus, wherein signal transmission and reception between the first and the second light devices are performed via a same channel.

2. The bidirectional signal transmission device using light of claim 1, wherein each of the first and the second diffraction elements is one of a diffraction grating and a hologram optical element for diffracting incident light in at least one of +1st and −1st order.

3. The bidirectional signal transmission device using light of claim 2, herein an interval between the first diffraction element and the first input/output port of the optical fiber is smaller than an interval between the first diffraction element and the first light device, and wherein an interval between the second diffraction element and the second input/output port of the optical fiber is smaller than an interval between the second diffraction element and the second light device.

4. The bidirectional signal transmission device using light of claim 2, wherein a diffraction pattern of the first and the second diffraction elements have one of an angular and a blazed cross-section.

5. The bidirectional signal transmission device using light of claim 4, wherein an interval between the first diffraction element and the first input/output port of the optical fiber is smaller than an interval between the first diffraction element and the first light device, and wherein an interval between the second diffraction element and the second input/output port of the optical fiber is smaller than an interval between the second diffraction element and the second light device.

6. The bidirectional signal transmission device using light of claim 1, wherein the first light device emits a polarized light beam having an orientation perpendicular to an orientation of a polarized light beam emitted by the second light device, the first diffraction element is a first polarization diffraction element designed so that polarized light incident from the VCSEL part of the first light device is transmitted straight through the first polarization diffraction element and received by the first input/output port of the optical fiber, and so that polarized light incident from the first input/output port of the optical fiber is diffracted in at least one of +1st and −1st order by the first polarization diffraction element, and headed for the photodiode part of the first light device, and the second diffraction element is a second polarization diffraction element designed so that polarized light incident from the VCSEL part of the second light device is transmitted straight through the second polarization diffraction element and received by the second input/output port of the optical fiber, and so that polarized light incident from the second input/output port of the optical fiber is diffracted in at least one of +1st and −1st order by the second polarization diffraction element, and headed for the photodiode part of the second light device.

7. The bidirectional signal transmission device using light of claim 6, wherein an optic axis of the first polarization diffraction element is approximately perpendicular to a direction of linear polarization of light emitted from the VCSEL part of the first light device, and an optic axis of the second polarization diffraction element is approximately perpendicular to a direction of linear polarization of light emitted from the VCSEL part of the second light device.

8. The bidirectional signal transmission device using light of claim 6, wherein each of the first and the second polarization diffraction elements is a refractivity change diffraction element obtained by forming a proton exchange region and a dielectric film on a diffraction pattern of a plate made of a birefringence material.

9. The bidirectional signal transmission device using light of claim 8, wherein an optic axis of the first polarization diffraction element is approximately perpendicular to a direction of linear polarization of light emitted from the VCSEL part of the first light device, and an optic axis of the second polarization diffraction element is approximately perpendicular to a direction of linear polarization of light emitted from the VCSEL part of the second light device.

10. The bidirectional signal transmission device using light of claim 1, wherein the optical unit further comprises a first lens installed at one of a location between the VCSEL part of the first light device and the first diffraction element, and a location between the first diffraction element and the first input/output port of the optical fiber, for coupling light from the VCSEL part of the first light device to the first input/output port of the optical fiber, and a second lens installed at one of a location between the VCSEL part of the second light device and the second diffraction element, and a location between the second diffraction element and the second input/output port of the optical fiber, for coupling light from the VCSEL part of the second light device to the second input/output port of the optical fiber.

11. The bidirectional signal transmission device using light of claim 1, wherein the optical unit is single-modularized, so that the optical unit has one of an electrical separation from the first and the second apparatuses, and electrical connection to the first and the second apparatuses.

12. The bidirectional signal transmission device using light of claim 1, wherein each of the first and the second circuit units comprises:

a driver for driving the VCSEL part; and an amplifier for amplifying a current signal output from the photodiode part.

13. The bidirectional signal transmission device using light of claim 12, wherein each of the first and the second circuit units further comprises a controller installed between the apparatus and both the amplifier and the driver, for converting the electrical signal from the apparatus into a signal that is suitable for controlling the driver, and converting a signal from the amplifier into a signal suitable for the apparatus.

14. The bidirectional signal transmission device using light of claim 13, wherein the controller comprises:

an encoder for encoding the electrical signal from the apparatus into an appropriate encoded signal;

a driver control core for converting the encoded signal into a converted signal that is suitable for controlling the driver, and applying the converted signal to the driver; and a decoder for decoding the signal from the amplifier into the signal that is suitable for the apparatus.

15. The bidirectional signal transmission device using light of claim 14, wherein the controller further comprises a multiplexer between the encoder and the driver control core.

16. The bidirectional signal transmission device using light of claim 13, wherein at least one of the first and the second circuit units further comprises a switch installed between the controller and both the driver and the amplifier, for selectively switching on and off at least one of the driver and the amplifier.

17. The bidirectional signal transmission device using light of claim 15, wherein the optical unit and at least one of the driver, the amplifier, the controller, the encoder, the driver control core, the decoder, and the multiplexer of the first and the second circuit units are contained within a single module.

18. A bidirectional signal transmission device using light comprising:

first light emitting and receiving means and second light emitting and receiving means, each for emitting light in a direction in which semiconductor material layers are stacked, and for receiving incident light;

transmitting means for transmitting an optical signal between the first and the second light emitting and receiving means;

first diffracting means and second diffracting means, each for selectively diffracting incident light so that light output from the transmitting means is received by one of the first and the second light emitting and receiving means; and first controlling means and second controlling means for respectively controlling the first and the second light emitting and receiving means, each of the first and the second controlling means including means for converting an electrical signal into an optical signal, and means for converting an optical signal transmitted by the transmitting means into an electrical signal, wherein signal transmission and reception between the first and the second light emitting and receiving means are performed via a same channel.

* * * * *